United States Patent Office 3,347,923
Patented Oct. 17, 1967

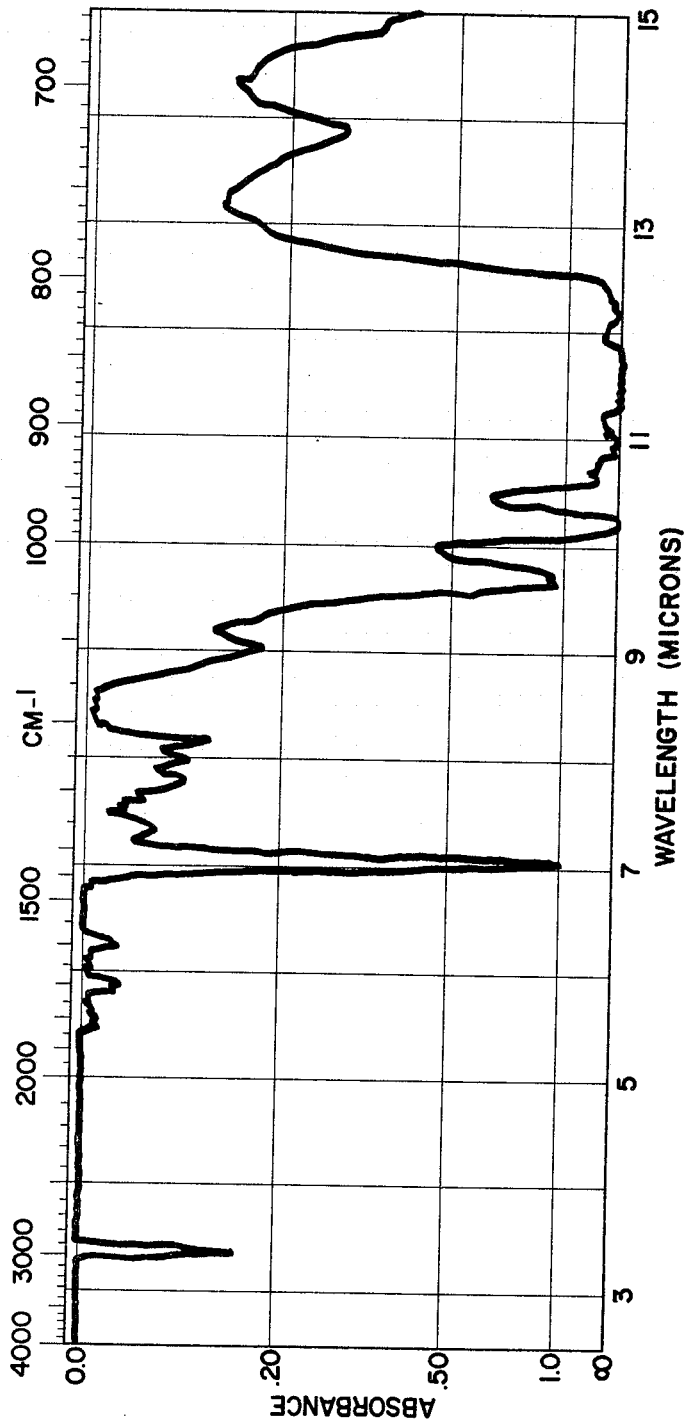
Fig. I
Arthur E. Messner
Bernard Freedman
Leland K. Beach
Inventors

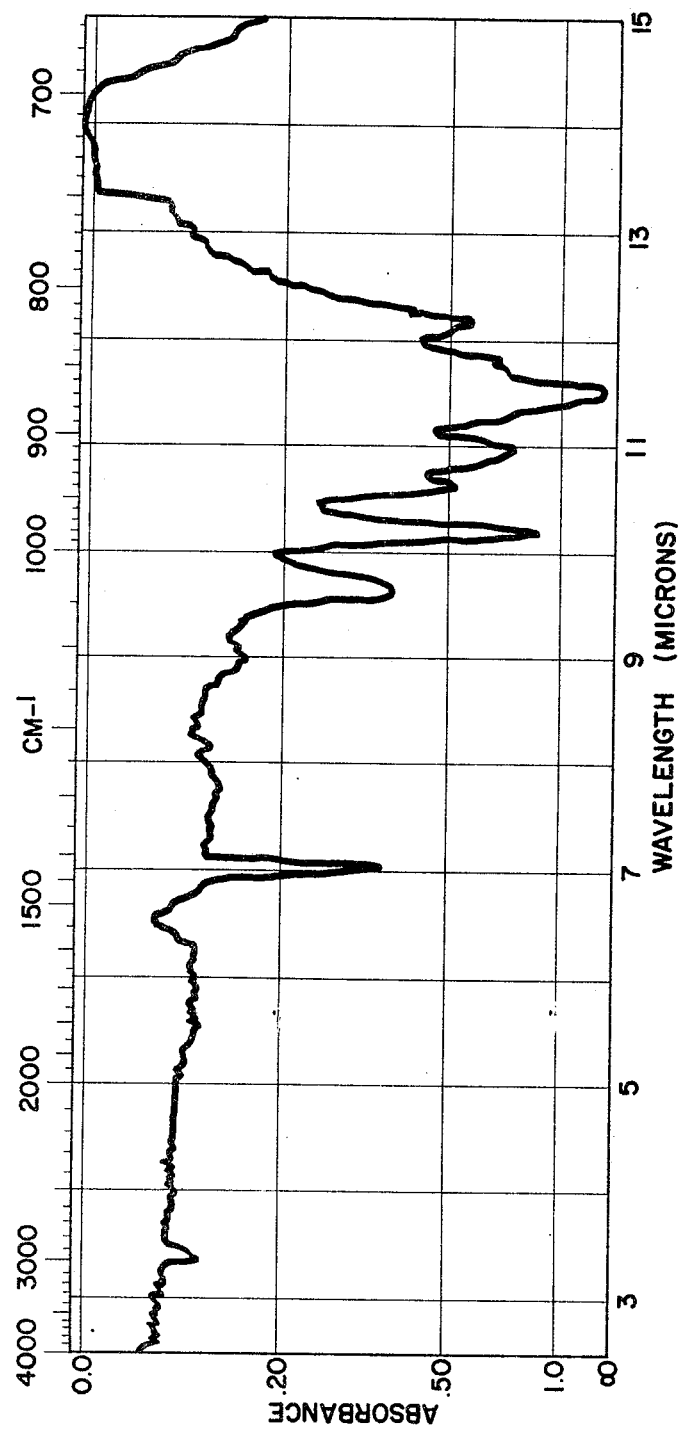
Fig. II
LIQUID 25.6 WT. % IN CCl₄ 0.025 MM CELL
Arthur E. Messner
Bernard Freedman
Leland K. Beach
Inventors
By R. S. Manahan   Patent Attorney

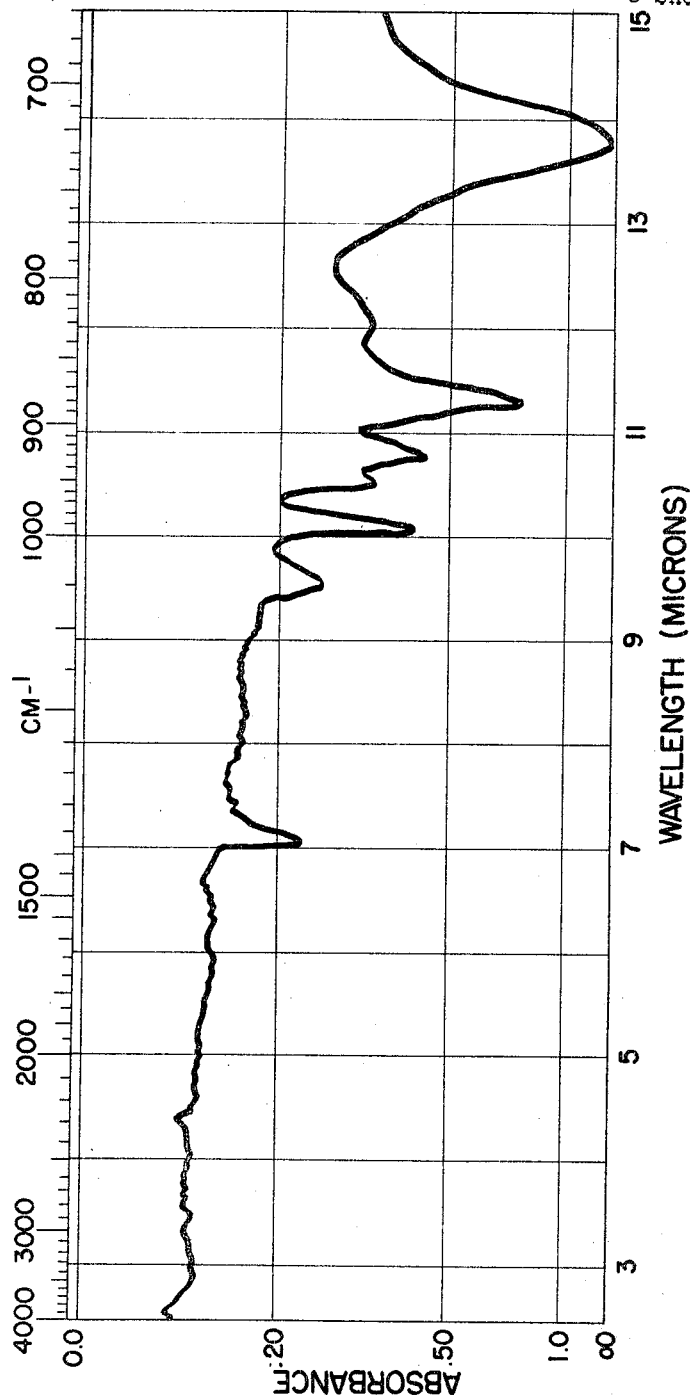

3,347,923
DIFLUOROAMINO COMPOUNDS AND THE PREPARATION THEREOF
Bernard Freedman, New Brunswick, and Leland K. Beach, Westfield, N.J., and Arthur E. Messner, deceased, late of Roselle Park, N.J., by Marilyn Messner, administratrix, Roselle Park, N.J., assignors to Esso Research and Engineering Company, a corporation of Delaware
Filed Dec. 1, 1959, Ser. No. 856,615
6 Claims. (Cl. 260—583)

The present invention relates to fluoroamino compounds and the preparation thereof. One aspect of the invention concerns the reaction of compounds containing allyl halide groups with tetrafluorohydrazine to form difluoroamino compounds; another aspect of the invention relates to new compounds, such as 1,2,3-tris-(difluoroamino) propane.

Strong oxidizers are quite valuable in the chemical field, especially for chemical fuels. Considerable work has been done to make better oxidizing agents for fuels, such as boron. Calculations indicate that compounds having a high $NF_2/C$ ratio will have excellent oxidizing properties. A number of attempts have been made to prepare various compounds of this type since they are excellent oxidizers in rocket propellant systems.

It has now been discovered that organic fluoroamines can be made by reacting a compound containing an allyl halide group with tetrafluorohydrazine either in the vapor or liquid phase. This reaction surprisingly results in the formation of 1,2,3-tris-(difluoroamino) compounds, e.g. 1,2,3-tris-(difluoroamino) propane. In these polydifluoroamino compounds the halogen, which is allyl to the double bond, is substituted by $NF_2$ and two $NF_2$ groups add to the double bond. The preparation of the tris compound by this process is unexpected because usually $NF_2$ groups add to the double bond and do not substitute.

FIGURE I is the infrared spectrum of pure liquid 1,2,3-tris-(difluoroamino) propane.

FIGURE II is the infrared spectrum of 1,2,3-tris-(difluoroamino) propane in carbon tetrachloride.

FIGURE III is the infrared spectrum of 1,2,3-tris-(difluoroamino) propane vapor.

The allyl halide-containing reactants used in the present invention to prepare polydifluoroamino compounds are unsaturated acyclic organic compounds which have 1, 2 or 3 halogen atoms attached to carbon atoms that are beta to a double bond, e.g. $-CH=CH-CBrH_2$. These unsaturated organic halogen compounds may be either mono- or diolefins and their chains may be either straight or branched. They are lower molecular weight compounds, that is to say, they contain 3 to 6 carbon atoms. Among the allyl halide-containing compounds which may be used in the present process are allyl bromide, allyl iodide, allyl chloride, 2-bromomethyl allyl bromide, 3-bromo-1,4-pentadiene, 5-bromo-1,3-pentadiene, and 3,4-dibromo-1,5-hexadiene. The halogen in these unsaturated organic halogen compounds may be chlorine, iodine or bromine, the latter being preferred. The tetrafluorohydrazine, which is a gas at ambient temperatures and atmospheric pressure, should be essentially free of substances which interfere with the reaction. It has been found that tetrafluorohydrazine having a purity of at least 99% is satisfactory for the purposes of the present invention, although lower purities can be tolerated if the impurity is non-reactive and non-inhibiting. When the reaction is carried out in the vapor phase, the tetrafluorohydrazine may be either preheated to reaction temperature or introduced into a reaction zone which is maintained at the desired temperature. In liquid phase reactions it may be bubbled through the liquid in the reaction zone which may consist of the other reactant alone or in admixture with an inert diluent. While liquid tetrafluorohydrazine can be used in these reactions, it is preferred not to do so because it is an especially hazardous chemical in the liquid form. Moreover, high pressures and low temperatures are usually necessary for such reactions.

The reaction temperature is not critical and practically any conventional reaction temperature may be employed, e.g. $-100$ to $300°$ C. The most suitable temperature range from an economic point of view is between 15 and $250°$ C., the higher temperatures, i.e. 150 to $250°$ C., being especially preferred because the reaction proceeds quite rapidly at these temperatures. The reaction pressure may be atmospheric, superatmospheric, e.g. up to 50 atmospheres, or subatmospheric pressures, e.g. as low as 10 mm. of mercury absolute pressure. The recommended pressure is the sum of the vapor pressures of the components in the reaction zone at the selected reaction temperature.

In one embodiment, the two reactants are independently preheated to the reaction temperature and then separately introduced into the reaction zone, which is maintained at the aforementioned temperature. The reactants are maintained in contact with each other in the reaction zone for several seconds to 1 or 2 hours. The reaction time at the optimum temperature is about 5 seconds to 60 minutes. Sufficient tetrafluorohydrazine should be used in the reaction to permit the introduction of at least one $NF_2$ group into the reactant. That is to say, that the halogen, which is on the allyl carbon should be substituted with an $NF_2$ group even though there is an insufficient amount of tetrafluorohydrazine present to permit addition of $NF_2$ groups across the double bond in the allyl halide-containing compound. The desired reaction can be achieved by reacting equimolar amounts of the particular reactants. If desired, a small excess of the allyl halide-containing compound may be used in the reaction mixture; however, in order to favor the formation of the tris compound, a several-fold excess, e.g. 3 moles per mole of tetrafluorohydrazine should be used in the reaction.

The reaction may be carried out either batchwise or continuously. Since the reaction products may comprise gases, liquids and solids, conventional recovery techniques should be employed to prevent the loss of any of the desired products. For instance, a Dry Ice condenser may be attached to the outlet of the reaction zone to trap any gas products. Solid products may be recovered by filtering and drying, while liquid products may be separated by vacuum fractional distillation. Where the product is made in relatively small amounts, chromatographic separating methods are advantageously employed.

Of the products prepared in accordance with the present process, the most desirable are those compounds which have an $NF_2$ group attached to each carbon in the compound. These alkanes, which have a carbon to $NF_2$ ratio of 1:1, are highly useful as oxidizing agents in high energy rocket propellant systems. These oxidizers may be described by the following formula:

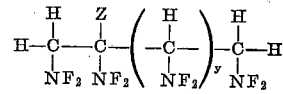

wherein C, H, N and F are the conventional chemical symbols; Z is hydrogen or difluoroaminomethyl; and $y$ is a number selected from the group 0, 2, and 3. The novel compounds prepared in accordance with the present invention are:

1,2,3-tris-(difluoroamino) propane
1,2,3-tris-(difluoroamino)-2-difluoroaminomethyl propane
1,2,3,4,5-pentakis-(difluoroamino) pentane
1,2,3,4,5,6-hexakis-(difluoroamino) hexane, The difluoroamino compounds prepared in accordance with the present invention are excellent oxidizing agents for fuels, e.g. boron, used in pure rockets. They also serve as intermediates in the preparation of nitriles, amines and other nitrogen-containing compounds of known utility.

The following examples are given to permit a better understanding of the process and to disclose the physical properties and characteristics of the products obtained from it:

EXAMPLE 1

Allyl bromide is preheated to 230° C. and is continuously introduced into a stainless steel tubular reactor, which is ¼ inch in diameter (outside) and 17 feet long, that is maintained at atmospheric pressure along with tetrafluorohydrazine which has been preheated to the same temperature. The mole ratio of allyl bromide to tetrafluorohydrazine is 1.1 to 1 and the contact time in the tubular reactor is about 1 minute. The reaction products are withdrawn from the reactor and the liquid products are condensed in a Dry Ice condenser and the gases are condensed in a liquid nitrogen trap. The excess $N_2F_4$ is recovered. The Dry Ice condensate is transferred to a multiplate vacuum distillation column equipped with a Dry Ice head condenser which can be switched to ice water as the distillation progresses. A chaser such as tribromopropane is added as a diluent. The distillation is carried out at 20 mm. Hg and five compounds are taken overhead. The mole percent yield of each product recovered and its boiling point are given in Table I:

*Table I*

| Products | Boiling Point, °C. | Mole Percent Yield Based on Allyl Bromide Reacted |
|---|---|---|
| Allyl difluoroamine | 41 | 33 |
| Allyl bromide | 70 | |
| 1,2,3-tris-(difluoroamino) propane | 127 | 33 |
| 1,2,3-tribromopropane | | 22 |
| 1,2-dibromo-3-difluoroaminopropane | 180–190 | ca. 12 |

The data in Table I show that the yield of the "tris" compound [1,2,3-tris-(difluoroamino) propane], which is the best oxidizer in the reaction product, is relatively low. When the above reaction was repeated using two moles of tetrafluorohydrazine per mole of allyl bromide, the yield of the "tris" compound was substantially increased.

The brominated products in the reaction mixture indicate that a bromination reaction is occurring in the reaction zone. The principal reaction is believed to be as follows:

$$3CH_2=CHCH_2Br + 3N_2F_4 \rightarrow$$
$$2CH_2NF_2CHNF_2CH_2NF_2 + CH_2BrCHBrCH_2Br$$

The initial reaction is thought to be the following:

$$2CH_2=CHCH_2Br + N_2F_4 \rightarrow 2CH_2=CH-CH_2NF_2 + Br_2$$

Other reactions, which for the purposes of the present invention may be considered side reactions, take place in the reaction mixture. For instance, some of the allyl difluoroamine may react with bromine to form 1,2-dibromo-3-difluoroamine propane.

The physical properties of the tris compound are shown in Table II:

*Table II.—Physical properties 1,2,3-tris-(difluoroamino) propane*

| | |
|---|---|
| Molecular weight | 197 |
| Density, g./ml.: | |
| @ 20° C. | 1.503 |
| @ 0° C. | 1.530 |
| Boiling point, °C. ca. | 127 |
| Melting point, °C. ca. | −111 |
| Vapor pressure, mm. Hg: | |
| @ −10° C. | 3 |
| @ +5° C. | 7 |
| @ +23° C. | 15 |
| Impact sensitivity @ 1 kg., inches | 3–7 |

The above tris compound was further identified by NMR (nuclear magnetic resonance) and infrared spectra. The fluorine resonance measurements obtained with a pure sample of 1,2,3-tris-(difluoroamino) propane are set forth in Table III.

*Table III.—Fluorine resonance measurements [1]*

| Location,[2] p.p.m. | Relative Intensity | H–F Coupling JHF (c.p.s.) |
|---|---|---|
| −116.7 | 1 | 28.2 |
| −134.2 | 2 | |

[1] Measurements made at 40 mc. at a sweep rate of 20.0 c.p.s.
[2] Measured with reference to trifluoroacetic acid.

The peak at −134.2 p.p.m. is assigned to the $NF_2$ on the primary carbons, while the peak at −116.7 was assigned to the $NF_2$ on the secondary carbon. The intensity of the −134.2 peak was twice that of the −116.7 peak indicating there are two $NF_2$ groups on primary carbons. The proton spectrum showed a triplet at 28.2 cycles and nothing else indicating that each carbon has a proton and also an $NF_2$ group.

FIGURE 1 is the infrared curve for this compound in the pure liquid state; FIGURE II is the curve obtained with a dilute carbon tetrachloride solution and FIGURE III is the curve obtained with gaseous tris compound.

EXAMPLE 2

The "tris" compound is particularly suitable as an oxidizing agent for boron fuels. A suitable rocket propellant composition utilizing this oxidizing agent is as follows:

*Table IV*

| Component | Wt. percent |
|---|---|
| 1,2,3-tris-(difluoroamino) propane | 48.0 |
| Tetranitromethane | 39.4 |
| Boron | 2.6 |
| Rubber binder | 10.0 |

This propellant has a calculated specific impulse of 282 sec.$^{-1}$.

It is not intended to restrict the present invention to the foregoing embodiment, but rather it should only be limited by the appended claims in which it is intended to claim all the novelty inherent in the invention.

The co-pending application, U.S. S.N. 856,614, filed Dec. 1, 1959 by Richard P. Rhodes and Donald A. Guthrie, and by the common assignee, discloses and claims the difluoroamino compound 1,2,3,4-tetrakis and (difluoroamino) butane, which is formed by reacting sufficient tetrafluorohydrazine with the conjugated diolefin 1,3-butadiene to make the diadduct of $N_2F_4$ with the butadiene or which can be prepared by reacting bis-(difluoroamino) butene with $N_2F_4$ to give the addition product which is the 1,2,3,4-tetrakis-(difluoroamino) butane. The 1,2,3,4-tetrakis-(difluoroamino) butane is different in configuration, properties, and preferred method of preparation from the compounds and preparation claimed in the present application.

What is claimed is:
1. Compounds having the formula:

$$H-\underset{NF_2}{\underset{|}{\overset{H}{\overset{|}{C}}}}-\underset{NF_2}{\underset{|}{\overset{H}{\overset{|}{C}}}}-\left(\underset{NF_2}{\underset{|}{\overset{H}{\overset{|}{C}}}}\right)_y-\underset{NF_2}{\underset{|}{\overset{H}{\overset{|}{C}}}}-H$$

wherein $y$ is a number selected from the group consisting of 0, 2, and 3.

2. 1,2,3-tris-(difluoroamino) propane.
3. Process for making a difluoroamino compound which comprises reacting with tetrafluorohydrazine an allyl halide group-containing unsaturated acyclic organic compound containing 3 to 6 carbon atoms and 1 to 2 double bonds in the molecule, at least one of the double bonds being in an allyl halide group, the tetrafluorohydrazine being reacted in a proportion for substituting an $NF_2$ group for a halogen atom in the allyl halide group and for addition to the double bonds at a reaction temperature in the range of about $-100°$ to $300°$ C., and recovering a resulting product having an $NF_2$ group attached to each carbon of the unsaturated cyclic organic compound reacted.

4. Process for making 1,2,3-tris-(difluoroamino) propane which comprises reacting allyl halide with sufficient tetrafluorohydrazine at temperatures of 15 to 250° C. to substitute an $NF_2$ group for the halogen atom in the allyl halide and to add $NF_2$ groups to the double bond of the allyl halide.

5. Process for making difluoroamino compounds which comprises reacting a molar proportion of allyl bromide with at least a molar proportion of tetrafluorohydrazine in a gaseous phase for a few seconds to 2 hours.

6. Process for making 1,2,3-tris-(difluoroamino) propane which comprises reacting allyl bromide with more than one mol of tetrafluorohydrazine per mol of the allyl bromide in a gaseous phase at 150 to 250° C. for 5 seconds to 60 minutes.

References Cited

Hoffman et al., Chemical Reviews, 62, pp. 1–18, 1962.

CHARLES B. PARKER, *Primary Examiner.*

L. D. ROSDOL, R. L. CAMPBELL, *Examiners.*

B. R. PADGETT, J. W. WHISLER, B. BILLIAN,
*Assistant Examiners.*